(12) United States Patent
Kahlon et al.

(10) Patent No.: US 8,286,137 B2
(45) Date of Patent: Oct. 9, 2012

(54) ACCELERATING MODEL CHECKING VIA SYNCHRONY

(75) Inventors: Vineet Kahlon, Princeton, NJ (US); Aarti Gupta, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 1197 days.

(21) Appl. No.: 12/054,575

(22) Filed: Mar. 25, 2008

(65) Prior Publication Data
US 2008/0282221 A1    Nov. 13, 2008

Related U.S. Application Data

(60) Provisional application No. 60/916,339, filed on May 7, 2007.

(51) Int. Cl.
*G06F 9/44* (2006.01)

(52) U.S. Cl. ........ 717/126; 717/104; 717/106; 717/124; 716/136

(58) Field of Classification Search .................... 717/124
See application file for complete search history.

(56) References Cited

U.S. PATENT DOCUMENTS

| | | | | |
|---|---|---|---|---|
| 5,694,539 | A * | 12/1997 | Haley et al. | 714/38.1 |
| 5,805,470 | A * | 9/1998 | Averill | 703/27 |
| 5,815,688 | A * | 9/1998 | Averill | 716/136 |
| 5,958,077 | A * | 9/1999 | Banerjee et al. | 714/738 |
| 6,079,031 | A * | 6/2000 | Haley et al. | 714/38.1 |
| 6,154,876 | A * | 11/2000 | Haley et al. | 717/133 |
| 6,212,491 | B1 * | 4/2001 | Bargh et al. | 703/14 |
| 6,550,057 | B1 * | 4/2003 | Bowman-Amuah | 717/126 |
| 6,701,514 | B1 * | 3/2004 | Haswell et al. | 717/115 |
| 6,907,546 | B1 * | 6/2005 | Haswell et al. | 714/38.11 |
| 7,089,534 | B2 * | 8/2006 | Hartman et al. | 717/125 |
| 7,370,312 | B1 * | 5/2008 | Steckel | 716/106 |
| 7,386,813 | B2 * | 6/2008 | Singh et al. | 716/103 |
| 7,617,431 | B2 * | 11/2009 | Ito | 714/744 |
| 7,712,081 | B2 * | 5/2010 | Biberstein et al. | 717/124 |
| 7,783,470 | B2 * | 8/2010 | Kahlon | 703/22 |
| 2002/0184560 | A1 * | 12/2002 | Wang et al. | 714/25 |
| 2003/0004926 | A1 * | 1/2003 | Ben-David | 707/1 |
| 2003/0058277 | A1 * | 3/2003 | Bowman-Amuah | 345/765 |
| 2005/0210433 | A1 * | 9/2005 | Clarke et al. | 716/5 |
| 2005/0278669 | A1 * | 12/2005 | Sidle et al. | 716/5 |
| 2006/0130010 | A1 * | 6/2006 | Rehof et al. | 717/136 |
| 2006/0136879 | A1 * | 6/2006 | Singh et al. | 717/136 |
| 2006/0161897 | A1 * | 7/2006 | Biberstein et al. | 717/124 |
| 2006/0218534 | A1 * | 9/2006 | Kahlon et al. | 717/124 |
| 2006/0248515 | A1 | 11/2006 | Qadeer et al. | |
| 2007/0011671 | A1 | 1/2007 | Kahlon et al. | |
| 2007/0143742 | A1 * | 6/2007 | Kahlon et al. | 717/124 |
| 2007/0192076 | A1 * | 8/2007 | Boutin | 703/13 |
| 2009/0044157 | A1 * | 2/2009 | Gupta et al. | 716/3 |

* cited by examiner

*Primary Examiner* — Chameli Das
(74) *Attorney, Agent, or Firm* — Joseph Kolodka; James Bitetto (57) ABSTRACT

A system and method for program verification by model checking in concurrent programs includes modeling each of a plurality of program threads as a circuit model, and generating a full circuit for an entire program by combining the circuit models including constraints which enforce synchronous execution of the program threads. The program is verified using the synchronous execution to reduce an amount of memory needed to verify the program and a number of steps taken to uncover an error.

4 Claims, 4 Drawing Sheets

ACCELERATING MODEL CHECKING VIA SYNCHRONY

RELATED APPLICATION INFORMATION

This application claims priority to provisional application Ser. No. 60/916,339 filed on May 7, 2007 incorporated herein by reference.

BACKGROUND

1. Technical Field

The present invention relates to software verification and debugging and more particularly to systems and methods for accelerating model checking by providing synchronous execution constraints.

2. Description of the Related Art

The development of effective techniques for debugging multi-threaded software is widely recognized to be a problem of fundamental practical importance. It is, however, also an extremely challenging one. A key reason for this is that subtle interactions between threads makes multi-threaded software behaviorally complex and hard to analyze, thus necessitating the use of formal methodologies for the analysis. It is not surprising then that the use of model checking—both symbolic and explicit state—for the verification of concurrent software has, for some time, been an active area of research.

Explicit state model checkers, such as Verisoft™ rely on exploring an enumeration of the states and transitions of the concurrent program at hand. Additional techniques such as state hashing for compaction of state representations, and partial order methods are typically used to avoid exploring all interleavings of transitions of the constituent threads. Symbolic model checkers, on the other hand, avoid an explicit enumeration of the state space by using symbolic representations of sets of states and transitions.

One of the first successful approaches in this regard was the use of BDDs to succinctly represent large state spaces for the purpose of model checking. More recently, SAT-based techniques have become popular both for finding bugs using SAT-based Bounded Model Checking (BMC) and for generating proofs via SAT-based Unbounded Model Checking (UMC).

SAT-based techniques strongly rely on search heuristics in order to prune state spaces. A lot of these heuristics depend on leveraging structural information about the system at hand. As a result SAT-based BMC has been shown to be very effective for debugging hardware designs which have a lot of inherent organization that these heuristics exploit. Since software programs are much less structured than hardware circuits developing similar heuristics has proven to be a more difficult problem.

SUMMARY

A system and method for program verification by model checking in concurrent programs includes modeling each of a plurality of program threads as a circuit model, and generating a full circuit for an entire program by combining the circuit models including constraints which enforce synchronous execution of the program threads. The program is verified using the synchronous execution to reduce an amount of memory needed to verify the program and a number of steps taken to uncover an error.

A program verification system includes a plurality of circuit models wherein each circuit model represents a program thread in a concurrent program. A full circuit model represents the entire concurrent program, and the full circuit model is composed of a combination of the circuit models as bound by constraints which enforce synchronous execution of the program threads. A model checker is configured to verify the concurrent program using the synchronous execution to reduce an amount of memory needed to verify the concurrent program.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In typical real-life concurrent programs, most computation is done locally within threads with synchronization or shared variable accesses occurring infrequently. The present embodiments, exploit this parallelism inherent in threads, by leveraging synchronous execution to get drastic reductions in the depth of witness traces during model checking. In turn, this reduces the depth to which a program needs to be explored to reach an error. Note that each unroll step of a bounded model checking (BMC) run increases the size of the program under consideration thereby increasing memory usage. Since memory is the key bottleneck in the verification of large-scale programs, using synchronous execution provides advantages to (i) potentially use BMC on larger programs thus increasing scalability, and (ii) increase the depth to which programs can be explored. Furthermore, to ensure scalability, we also show how to effectively combine synchronous execution with symbolic model checking while at the same time leveraging partial order reduction and on-the-fly transactions.

To ensure that the temporal property being model checked is preserved during synchronous execution, we leverage a new notion of temporal conflicts. We show that temporal conflicts can also be used to improve partial order reduction techniques by permitting computation of smaller stubborn sets than the ones based on the notion of visible transitions.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

Figure 1:
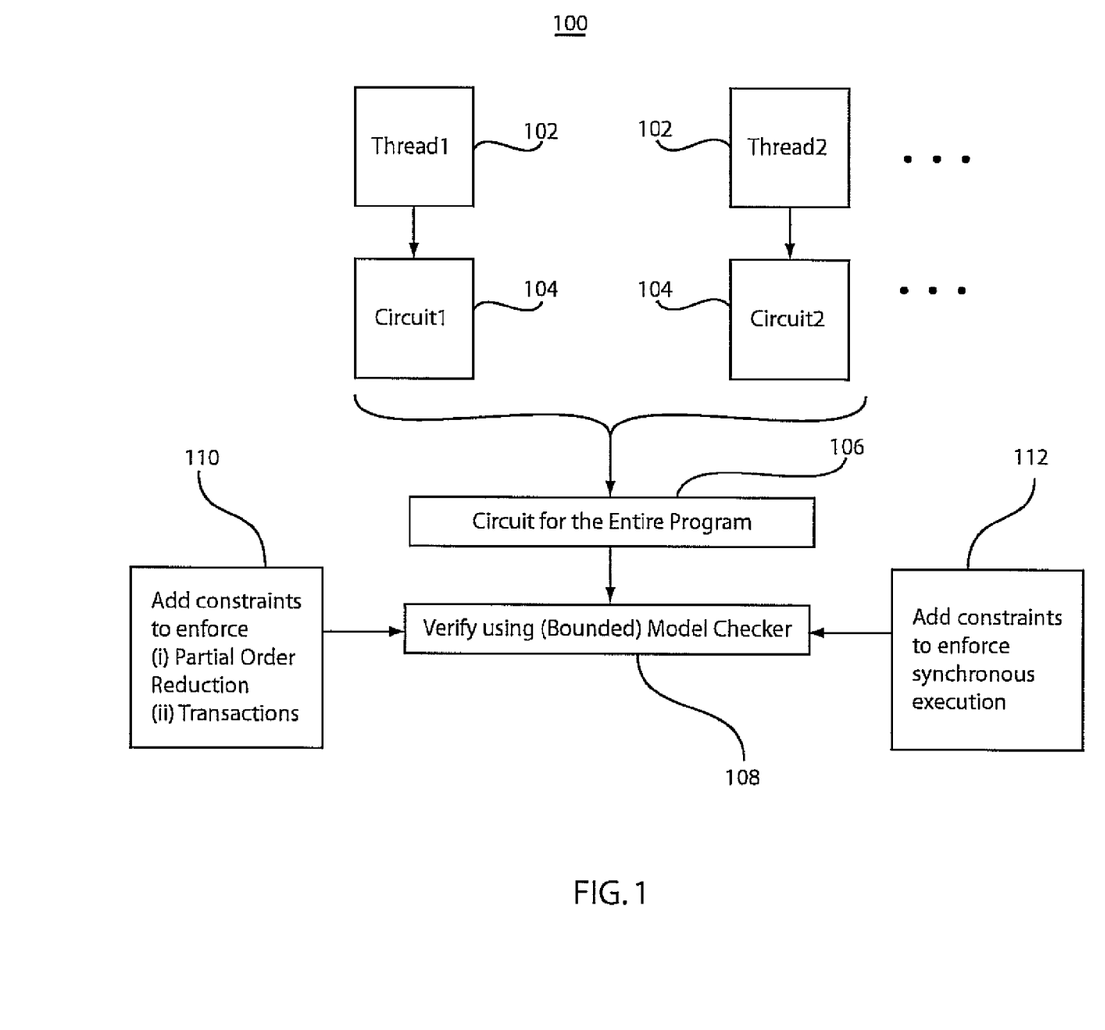
FIG. 1 is a block/flow diagram of a system/method for program verification using model checking in accordance with one illustrative embodiment.

Referring now to the drawings in which like numerals represent the same or similar elements and initially to FIG. 1, a block/flow diagram shows a system/method 100 for improved model checking in accordance with one illustrative embodiment. In one embodiment, building circuits or SAT-based models 104 for threads 102 of concurrent multi-threaded programs is provided. Advantageously, existing powerful SAT-based techniques for hardware verification can be leveraged. This approach permits exploitation of the synergy that results from combining the ability of partial order techniques to reduce the state space of the system to be explored—with the power of symbolic model checking to explore large state spaces. An added advantage of modeling each thread 102 in a concurrent program as a circuit 104 is that for verification purposes, parallelism inherent in the threads can be exploited by executing these circuits synchronously.

In concurrent programs, shared variables are accessed in a very small number of functions. Most of the computation is done for threads locally and synchronization with other threads occurs infrequently. Thus, by executing the thread local code synchronously, we can get drastic reductions in the depths of witness traces for properties and, as a consequence, in the depth to which a program needs to be explored for detecting an error. This is important as each unroll step of a BMC run increases the size of the circuit under consideration thus increasing memory usage. Since memory is a key bottleneck in the verification of large designs, using synchronous execution, we can potentially use BMC on larger programs thus increasing the scalability as well as the depth to which they can be explored.

Synchrony can be used to accelerate the model checking of concurrent programs for LTL properties, for example. Executing a concurrent program synchronously changes its semantics and creates several challenges. First, we need to ensure that we do not miss any necessary interleavings induced by shared variable updates and synchronization primitives. Second, in switching from interleaving to synchronous semantics, the temporal property being model checked needs to be preserved. Finally, to address state explosion, we show how to integrate synchronous execution with partial order reduction, transactions and symbolic model checking.

The given concurrent program is translated into a circuit-based model or models 104. Assuming bounded data and bounded recursion, we obtain a finite model (104) for each individual thread 102 wherein each variable of the thread is represented in terms of a vector of binary-valued latches and a boolean next-state function for each latch. Then, using a scheduler, we compose the circuits for the individual threads into one single circuit 106 for the entire concurrent program. Verification is then carried out on this circuit in block 10B preferably using a bounded model checker. In blocks 112 and 110, synchronous execution, partial order reduction and transactions are incorporated into the framework by statically augmenting the circuit-based boolean encoding of the given concurrent program with additional constraints.

Issues arising out of synchronization primitives and the preservation of temporal properties are handled by treating them as conflicts. Whereas thread local operations can always be executed in parallel, operations on shared variables or those involving synchronization primitives can affect the control flow of both threads and so we need to explore all necessary interleavings of such operations. Such synchronization imposed constraints are captured using the notion of synchronization conflicts in block 112. We note that such synchronization based conflicts may also be used in partial order reduction (POR) in block 110.

Figure 2:
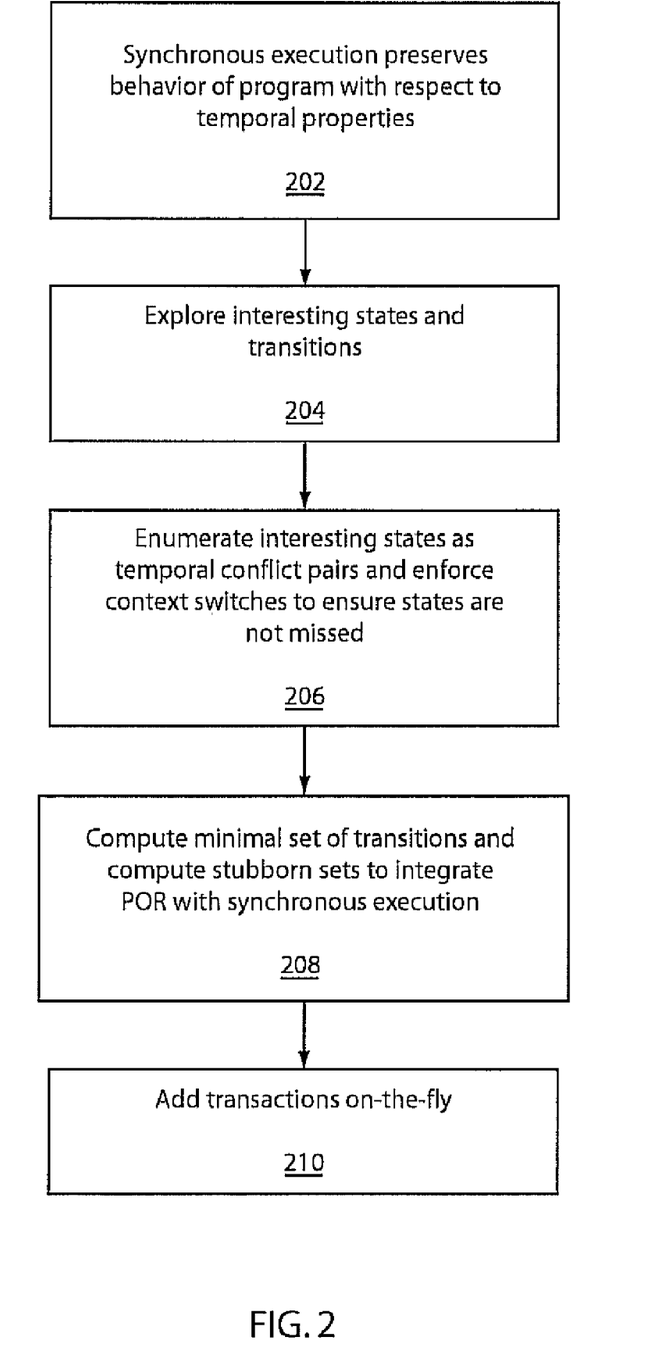
FIG. 2 is a block/flow diagram of a system/method for determining interesting states as temporal conflict pairs in accordance with one illustrative embodiment.

Referring to FIG. 2, in block 202, we need to make sure that synchronous execution preserves the behavior of the concurrent program with respect to the given temporal property, f, viz., $CP_{int}|=f$ iff $CP_{sync}|=f$, where $CP_{int}$ and $CP_{sync}$ denote, respectively, the state transition diagrams of the given concurrent program CP under interleaving and synchronous semantics, and f is a stuttering insensitive temporal logic formula.

We only consider LTL\X (Linear Temporal Logic) formulae to demonstrate the present principles, however other formulae may be employed. Executing a program synchronously changes its semantics. Moreover, each temporal property defines a set of global states and transitions of interest in the given program, viz., states on which its atomic propositions are interpreted to be true and transitions which when executed cause a change in the valuations of atomic propositions appearing in the given temporal property. In block 204, these states and transitions are explored in $CP_{sync}$.

In block 206, we enumerate all interesting states as temporal conflict pairs. Then, by enforcing a context switch for each temporal conflict pair, we ensure that we do not miss exploring any of these global states of interest in $CP_{sync}$ thereby preserving f. In general, enumerating all temporal conflict pairs directly from the syntax of the given formula f might be cumbersome. However, noting that a Büchi automaton $B_{\neg f}$ for $\neg f$ captures all the necessary information, we can, capture the information by analyzing $B_{\neg f}$ and efficiently generate these pairs. Our notion of temporal conflicts is more refined than existing notions of visible transitions used to detect conflicts for POR in that our notion takes into account the temporal structure of the given property as opposed to visible transitions which just track the control states of the given program over which atomic propositions of f are interpreted.

An important consequence is that using temporal conflicts instead of the notion of visible transitions leads to far fewer context switches. Thus, our notion of temporal conflicts can also be seen as a more refined way to compute stubborn sets and thereby enhance POR in addition to leveraging synchronous execution and symbolic model checking.

Having identified the synchronization (202) and temporal conflicts (204, 206), we next compute a minimal set of transitions that need to be explored from each state in block 208. This includes generalizing the standard procedure for computing conditional stubborn sets which handles only synchronization constraints. This permits us to seamlessly integrate partial order reduction with synchronous execution.

Finally, on block 210, we show how to add transactions on-the-fly for which we use the technique presented in V. Kahlon, A. Gupta, and N. Sinha, "Symbolic model checking of concurrent pro-grams using partial orders and on-the-fly transactions." In CAV, 2006 (hereinafter Kahlon et al.), incorporated herein by reference, that is based on analyzing patterns of lock acquisition as opposed to locksets. This permits us to cut down on the number of interleavings that need to be explored by essentially disallowing certain context switches to increase the granularity of transitions resulting in a reduced state space.

Thus, we have presented a new approach for model checking concurrent programs that combines the power of synchronous execution with symbolic techniques, partial order reduction and on-the-fly transactions while at the same time retaining the flexibility to employ a broad arsenal of model checking techniques—both SAT and BDD-based—for checking not just reachability but a richer classes of linear-time temporal properties.

System Model: We consider concurrent systems comprised of a finite number of processes or threads where each thread is a deterministic sequential program written in a language such as C. Threads interact with each other using communication/synchronization objects like shared variables, locks and semaphores.

Formally, we define a concurrent program CP as a tuple (T, V, R, $s_0$), where T={$T_1, \ldots, T_n$} denotes a finite set of threads, V={$v_1, \ldots v_m$} a finite set of shared variables and synchronization objects with $v_i$ taking on values from the set $V_i$, R the transition relation and $s_0$ the initial state CP. Each thread $T_i$ is represented by the control flow graph of the sequential program it executes, and is denoted by the pair ($C_i, R_i$), where $C_i$ denotes the set of control locations of $T_i$ and $R_i$ its transition relation. A global state s of CP is a tuple (s[1], ..., s[n], v[1], ..., v[m]) ∈ S=$C_1$ x ... x. $C_n$ x. $V_1$ x ... x. Vm, where s[i] represents the current control location of thread $T_1$ and v[j] the current value of variable $v_j$. The global state transition diagram of CP is defined to be the standard interleaved composition of the transition diagrams of the individual threads.

Thus, each global transition of CP results by firing a local transition of the form ($a_i$, g, u, $b_i$), where $a_i$ and $b_i$ are control locations of some thread $T_i$=($C_i$, $R_i$) with ($a_i,b_i$) ∈Ri; g is a guard which is a Boolean-valued expression on the values of local variables of $T_i$ and global variables in V; and u is function that encodes how the value of each global variable and each local variable of $T_i$ is updated. A transition t=($a_i$, g, u, $b_i$) of thread $T_i$ is enabled in state s iff s[i]=$a_i$ and guard g evaluates to true in s. If s[i]=$a_i$ but g need not be true in s, then we simply say that t is scheduled in s. We write $$s \xrightarrow{t} s^1$$

to mean that the execution of t leads from state s to $s^1$. Given a transition t∈T, we use proc(t) to denote the process executing t. Finally, we note that each concurrent program CP with a global state space S defines the global transition system $A_G$=(SΔ, $s_0$), where Δ ⊆ S×S is the transition relation defined by (s, $s^1$)∈Δ iff ∃t∈T:

$$s \xrightarrow{t} s^1;$$

and $s_0$ is the initial state of CP.

Synchronous Execution: A concurrent process $T_1$(a) and $T_2$(b) accessing shared variable x is shown in the EXAMPLE 1(a) and 1(b).

EXAMPLE 1(a)

```
foo( ){
    1a: g = o;
    2a: bar ( );
    3a: g = 8;
    4a: x = 1;
    5a: bar' ( ) ;
    6a: Race0;
}
```

EXAMPLE 1(b)

```
goo( ){
    1b: i = 5;
    2b: y = 2;
    3b: car ( );
    4b: x = 1;
    5b: Car' ( ) ;
    6b: Race1 ;
}
```

Consider the concurrent program CP shown in Examples 1(a) and 1(b), each comprising one of two threads $T_1$ and $T_2$ accessing shared variable x. Assume that x is not accessed by functions bar and car. Suppose that our goal is to detect the data race represented by the labels $Race_0$ and $Race_1$. In other words, we want to decide whether CP satisfies g=EF ($Race_0$^$Race_1$) which it does. Our focus is on the length of witness traces for g as this governs the depth to which the state space of CP needs to be explored to detect the race.

In an interleaved model of computation, the length of a witness for the above data race would be the sum of the lengths of the local computations of the individual threads $T_1$ and $T_2$ leading to locations $Race_0$ and $Race_1$, respectively. However, we note that since functions bar and car do not access any shared variables, each of their statements could be executed in parallel with any statement of the other thread. On the other hand, statements at program locations 4a and 4b both update the same shared variable, because of which we need to explore both of their interleavings. Thus, threads $T_1$ and $T_2$ can be executed synchronously until one of the threads, say $T_1$, reaches control location 4a or 4b.

Now, there are two possible scenarios to consider. Either $T_1$ alone executes 4a or, to account for the other interleaving, $T_1$ waits for $T_2$ to first execute 4b. In the first case, both threads can now again start executing synchronously. Let $d_1$ and $d_2$ be the number of program statements executed locally by $T_1$ and $T_2$, respectively, along a witness global computation of CP for the data race. Then, in the interleaved model the depth of the witness produced would be $d_1+d_2$, whereas in the (partially) synchronous execution model, the depth would be the maximum of $d_1$ and $d_2$ plus 1, with the extra step needed to account for the stuttering produced when $T_1$ alone was allowed to execute 4a while exploring the interleavings enforced by the shared variable x.

In the second scenario, $T_1$ has to first wait for $T_2$ to execute 4b after which both threads can start executing synchronously again. In this case, if $d_{4a}$ and $d_{4b}$ are the depths of locations 4a and 4b, respectively, the depth of the witness is Max($d_1$, $d_2$)+($d_{4b}-d_{4a}$), which is still considerably less than $d_1+d_2$.

Note that we need not have considered the second scenario at all as producing one witness suffices for a given property.

In real-life code, the effect of reduction in bug depth via partial synchronous execution is even more pronounced. This is because in a concurrent program, shared variables are typically accessed in a very small fraction of the total functions. Most of the computation is done thread locally and synchronization with other threads occurs relatively rarely. Thus, by executing the thread local code synchronously, we can get drastic reductions in the depth of witness traces for properties and, as a consequence, in the depth to which the program needs to explored for detecting an error.

One goal, therefore, is to change the interleaving semantics of the given concurrent program CP to a partially synchronous semantics while ensuring that all interleavings enforced by shared variable accesses are explored. One key point, as noted above, is that if in the current global state s, an operation op of thread $T_1$, say, accessing a shared variable x is enabled and if the other thread can, in some future, execute an operation op' accessing x, then we need to explore both interleavings wherein we either let only $T_1$ execute op first or we let it stutter until $T_2$ executes op'. Such a pair of operations (op, op') is a synchronization induced conflict and can be formally captured using, e.g., partial order reduction.

Might-be-first-to-interfere: Let op and op' be two operations on the same object O and s be a reachable state. The relation op $\triangleright_s$ op' (means that op and op' are conflicting operations. i.e., access a common shared object) holds if there exists a sequence $$s = s_1 \xrightarrow{t_1} s_2 \xrightarrow{t_2} \ldots \xrightarrow{t_n} s_{n+1}$$

of transitions in $A_G$ such that $\forall 1 \leq i \leq n: \forall op''$ on O used by $t_i$: op and op'' are independent in state $s_i, t_n$ uses op', and op and op' are dependent in $s_n$.

Thus, the above can be formally re-stated as—if in the current global state S, a thread, $T_1$, is executing operation op and there exists an operation op' of thread $T_2$ such that op $\triangleright_s$ op', then we need to explore both interleavings where we either execute $T_1$ first or we let $T_1$ stall until $T_2$ executes op'. op $\triangleright_s$ op' means op might-be-first-to-interfere with operation op'.

Preserving Temporal Properties: Merely accounting for synchronization conflicts in not sufficient. Synchronously executing a concurrent program reduces bug depths but also changes its semantics. One important consequence is that we need ensure that the given temporal property f is preserved, viz., $CP_{int}$/=f iff $CP_{sync}$/=f, where $CP_{int}$ and $CP_{sync}$ denote the transition diagrams of CP with interleaving and synchronous semantics, respectively.

In the previous example (1(a) and 1(b)), suppose that we want to check whether the property $g=E(F(1a\hat{}2b\hat{}F(6a\hat{}6b)))$ holds. Since the two threads (Ex. 1(a) and Ex. 1(b)) access shared variable x only at locations 4a and 4b, simply executing the two threads synchronously until one of them reaches either of these locations will result in a computation prefixed by the sequence (1a, 2a), (1b, 2b). In this case, $CP_{int}$/=f but $CP_{synt}$≠f as due to synchronous execution both $T_1$ and $T_2$ exit in 1a and 2a, respectively, simultaneously whereas in order for CP to satisfy f, $T_1$ needs to "wait" at program location 1a until $T_2$ reaches location 2b. To ensure that f holds, we need to also execute the interleaving that forces $T_1$ to wait until $T_2$ executes 2b. Thus, there is now a new kind of 'conflict' between the operations at program locations 1a and 2b even though no shared variable is accessed at either location. We refer to such conflicts that are introduced by the temporal property as temporal conflicts. Note that temporal conflicts can arise even when we are model checking simple data race-like properties, e.g., $EF(c_1\hat{}b_2)$, where $c_1$ and $b_2$ are control locations occurring in loops in different threads.

Along a computation satisfying $g=E(F(1a\hat{}2b\hat{}F(6a\hat{}6b)))$, the only relative orderings between pairs of local states that do matter are (1a, 2b), (2b, 1a), (6a, 6b), (6b, 6a). Indeed, since 1a and 2b need to occur together in a global state, if $T_1$ is in local state 1a, we permit an interleaving where $T_1$ waits for $T_2$ to reach 2b, if possible, and vice versa. In general, given an LTL property f, we need to enumerate all possible pairs of (atomic proposition that are) control states occurring in g that can occur together in a computation satisfying Eg. This might be cumbersome looking merely at the syntax of g. However, a Büchi automaton $B_g$ for g captures the necessary information, by encoding all possible models for g. Without loss of generality, we may assume that atomic propositions of g are control states of $T_1$ or $T_2$ or negations thereof. Indeed, any atomic proposition h involving data variables can be converted to an expression involving purely control locations by introducing new program statements with an if condition guarded by h.

In general, each transition tr:

$$a \xrightarrow{e} b$$

of $B_g$ is labeled with a boolean expression e of atomic propositions of g which, in our case, are control states. Writing e in disjunctive normal form as $e=e_1 \vee \ldots \vee e_k$, we can replace tr with k transitions from a to b with the ith being labeled with $e_i$. Thus, we can assume that e is a conjunction of control states of $T_1$ or $T_2$ or negations thereof. Thus, e is either true or of the form $e_{11}\hat{}\ldots\hat{}e_{1k1}\hat{}e_{21}\hat{}\ldots\hat{}e_{2k2}$, where $e_{ij}$ is a control state of $T_1$ or negation thereof. Transitions labeled with false are dropped. Now we can simply read off the temporal conflict pairs from $B_g$ as pairs of the form $(c_1, c_2)$, where $c_1$ is a control state of $T_1$ and there exists a transition of $B_g$ labeled with $e_{11}\hat{}\ldots\hat{}e_{1k1}\hat{}e_{21}\hat{}\ldots\hat{}e_{2k2}$, where for i=1,2, there exists $j_i \in [1 \ldots k_1]$ such that $e_{ij_i}$ is either of the form $c_i$ or of the form $\neg c_i$. Intuition behind defining the conflicts is this fashion is to force context switches before and after control states where the valuations of atomic propositions change.

Note that the natural way of defining conflict pairs would be to enumerate all pairs of control locations that satisfy atomic propositions of the given temporal formula. Indeed, if we are given a formula of the form $EF(c_1\hat{}\neg c_2)$, where $c_i$ is a control location of $T_i$, then we would generate all pairs $(c_1, c'_2)$, where $c'_2 \in C_2 \setminus \{c_2\}$. However, since the cardinality of $C_2 \setminus \{c_2\}$ is likely to be high, it will generate too many conflict pairs and force too many context switches thus killing the model checking run. Instead, we generate just one conflict pair $(c_1, c_2)$, which forces a context switch before and after control state $c_2$ of thread $T_2$. In other words, by forcing context switches only at those control locations where the atomic propositions of the given temporal formula change value instead of where they hold true, we can drastically cut down on the number of conflict pairs (and hence context switches) needed while still preserving the given property.

Figure 3:
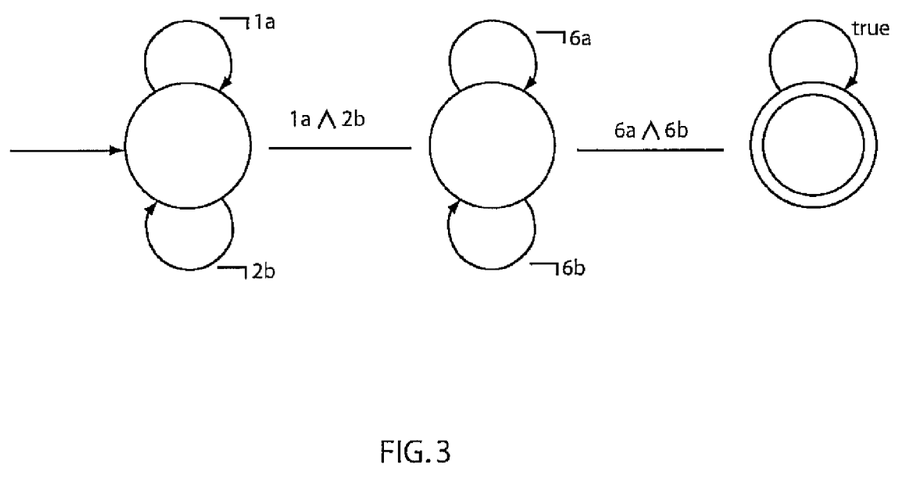
FIG. 3 is a diagram showing a simplified Büchi automaton for determining conflicts in accordance with one illustrative embodiment.

Let $TC_g$ be the set of all temporal conflict pairs of g. In defining the synchronous semantics $CP_{sync}$ of CP, we satisfy for each temporal conflict pair $(c_1, c_2) \in TC_g$ the constraint that if thread $T_1$ is currently in control location $c_1$ and if $T_2$, could in future reach control location $c_2$, then we need to consider both interleavings where location $c_1$ is executed before $c_2$. A simplified Büchi automaton $B_f$ for $g=E(F(1a\hat{}2b\hat{}F(6a\hat{}6b)))$ is given in FIG. 3. The simplified Büchi automaton of FIG. 3 is labeled in accordance with the example 1(a)/1(b). It can be seen that the set of temporal conflict pairs is {(1a, 2b), (6a, 6b)}. Since (1a, 2b) is a temporal conflict pair, in $CP_{sync}$, we will be forced to explore the interleaving where $T_1$ waits for $T_2$ to first execute 2b. This ensures that $CP_{sync}/=f$ iff $CPint_s/=f$. Indeed, each temporal property defines a set of global states of CP of interest, viz., those on which its atomic propositions are interpreted to be true. The remaining states act as 'white space' with respect to the property. By introducing context switching via temporal conflict pairs, we ensure that none of these global states of interest miss exploration in $CP_{sync}$.

Given $TC_g$, we can, as for constraints arising out of synchronization primitives, capture temporal constraints using a temporal might-be first-to interfere relation $\triangleright_s^{temp}$.

Temporal-Might-be-first-to-interfere: If op and op' are two operations at locations c and d of $T_1$ and $T_2$, respectively, (not necessarily on the same object) with (c, d)∈$TC_g$, and s a reachable state, the relation op$\triangleright_s^{temp}$op' holds if there exists a sequence of transitions in $A_G$ such ∀1≦i<n: for control location c" at $t_i$: (c, c")∉$TC_g$ and the control location at $t_n$ is d.

The issue of tracking temporal conflicts also arises when partial order reduction is applied in the model checking of a general LTL temporal formula f. Techniques have been proposed for addressing this problem which can, broadly speaking, be classified into two categories based on whether the synchronization of the Büchi automaton $B_f$ for the given temporal property f with the system to be verified is based on states or on actions labeling transitions.

In the present case, properties are interpreted over control states of threads in the given concurrent program. For such a framework, where the synchronization of $B_f$ with the given program is state based, temporal conflicts have traditionally been incorporated using the notion of visibility of transitions. A transition is said to be visible if executing it affects at least one proposition in the given temporal property f—the intuition being that only the firing of such transitions can affect the valuation of f. Thus, techniques for computing persistent sets (including the known stubborn set and ample set methods) based on the notion of visible transition will declare a (temporal) conflict between each pairs of control states $c_1$ and $c_2$ of threads $T_1$ and $T_2$, respectively, where $c_1$ and $c_2$ both appear in f. However, this notion of visibility is too coarse as it ignores the structure of the given temporal property. This temporal insensitivity can result in too many context switches as is illustrated by the following example 2.

EXAMPLE 2

Concurrent Program with Threads $T_1$(2(a)) and $T_2$ (2(b))

```
foo( ){                      goo( ){
    1a: x = 0;                   1b: p = 0;
    2a: for (i = 0; i < 1000; i++)   2b: q = 1;
```

-continued

```
    3a: y++ ;                    3b: r = 2;
    4a: x = 1                    4b: t = 0;
}                            }
    T_1: 2(a)                    T_2: 2(b)
```

Suppose that we want to check whether the property f=E (1a^4b^F(3a^F(4a))) holds at the initial state of the program comprised of two threads executing functions foo and goo shown in Example 2. Using the notion of visibility, we see that each of the locations 1a, 3a and 4a conflict with 4b. During BMC, when the loop in unrolled 1000 times it will end up producing 1000 conflicts between 3a and 4b thus resulting in too many context switches. However, since the only temporal conflict pair given by the Büchi Automaton is (1a, 4b), we will introduce only 1 conflict. Indeed, only 1a and 4b need occur together for the property to be satisfied. There are no such constraints on other control locations. Note that depending on the atomic propositions the number of context switches might easily blow up for a large program if one uses the standard notion of visibility. Thus, the notion of temporal-might-be-first-to-interfere, in accordance with the present principles, is more refined as it takes the structure of the temporal property into account using information gleaned from its Büchi automaton, thereby resulting in much lesser context switches.

Thus, even though the original goal was to leverage synchronous execution semantics and not POR, our notion of temporal conflicts can also be seen as a more refined way to compute ample and stubborn sets and thereby enhance POR in addition to leveraging synchronous execution and symbolic model checking.

An orthogonal technique for reducing conflicts that leverage formula structure is given in the prior art. The boolean operators in the given temporal formula are driven upwards in the formula as far as possible using the distributive properties of temporal operators with respect to boolean connectives. Then, if the original formula f is rewritten as a boolean function of the subformulas $f_1, \ldots, f_n$ it suffices to compute conflicts individually over each sub-formula $f_i$ instead of the entire formula f. Since one does not need to compute conflicts across the subformulas, there can be a significant reduction in the total number of conflicts for f in accordance with the present principles.

In the framework where synchronization between the Büchi Automaton $B_f$ and a given system is done via actions, the standard approach is to treat $B_f$ just like any other process. This technique implicitly incorporates the structure of the given temporal property in the detection of temporal conflicts to a greater extent than the one based on visible transitions. However, as discussed before, to prevent unnecessary context switches, care must be taken even here to involve only those transitions that change the valuations of atomic propositions of the given formula instead of those that merely access control states appearing in the given formula.

Synchronous Execution+POR+Transactions: Partial-order reduction (POR) exploits the fact that concurrent computations are essentially partial orders on operations of threads on communication objects, and hence, we need not explore all interleavings of operations of threads comprising a given concurrent program that realize this partial order—but only a few. In practice, this reduction is realized by exploring from each state only those transitions that belong to a persistent set of that state instead of all the enabled transitions. A persistent set for a global state s of CP captures a minimal set of transitions that need to be explored from each global state of the given concurrent program in order to ensure that all necessary interleavings induced by synchronization primitives are explored.

Partial order reduction based on temporal conflicts takes into account only the constraints arising out of synchronization primitives but not the temporal constraints. Capturing these synchronization constraints via the $\triangleright_s$ relation then leads to computing conditional stubborn sets. For this, dependencies between transitions, arising out of operations on shared communication objects are captured using the $\triangleright_s$ relation which encodes for each operation op used by a transition in a state s which other operations might be first to interfere with op from the current state s.

For synchronous execution, we have to additionally incorporate temporal constraints as discussed previously. This can be easily accomplished by defining a new dependency relation that is the union of the might-be-first-to-interfere relation $\triangleright_s$ (captures synchronization conflicts) and temporal-might-be-first-to-interfere relation $\triangleright_s^{temp}$ (captures temporal conflicts). This leads to a new method as shown in example 3 to compute (an over-approximation of) persistent sets. For each local transition $$a \xrightarrow{g} b$$

or a thread, we let used(t) denote the set of operations on variables and synchronization objects executed during the execution of t.

EXAMPLE 3

Method for Computing Conditional Stubborn Sets

1. Initialize $T_s=\{t\}$, where t is some enabled transition in s.
2. For each $$t = a \xrightarrow{g} b \in T_s$$

(a) add to $T_s$ all transitions t' such that proc(t)≠proc(t') and
$\exists op \in used(t), \exists op' \in used(t'): op \triangleright_s^{temp} op'$.
(b) If t is disabled in s,
  i. if $T_j$=poc(t) and s[j]≠a, then add to $T_s$ all transitions t' of $T_j$ of the form $$c \xrightarrow{g'} a,$$

or
  ii. choose a condition $c_j$ in the guard g of t that evaluates to false in s; then, for all operations op used by t to evaluate $c_j$, add to $T_s$ all transitions t' such that $\exists op'.\ used(t'): op \triangleright_s op'$.
(c) If t is enabled in s add to $T_s$ all transitions t' such that
  i. proc(t)≠proc(t') and $\exists op \in used(t), \exists op' \in used(t'): op \triangleright_s op'$.
3. Repeat step 2 until no more transitions can be added in $T_s$. Then return all transitions in $T_s$, that are enabled in s.

Note that for computing conditional stubborn sets in step 2a, where we include in $T_s$, transitions that are temporally dependent with some transitions in $T_s$. Due to this step, extra transitions capturing temporal constraints are added to $T_s$ resulting in a superset of a persistent set. As discussed above, these extra transitions are needed to preserve the property being checked during synchronous execution which was not an issue in partial order reduction.

Leveraging Lock Acquisition Patterns for On-the-fly-Transactions: Determining the relations $\triangleright_{s,r}$ and $\triangleright_s^{temp}$ precisely would need an exploration of the state space of the program at hand, which is precisely what we want to avoid. Therefore, in practice, we employ static analysis to compute over-approximations of relations $\triangleright_{s,r}$ and $\triangleright_s^{temp}$. Towards that end, we say that two operations op and op' are statically dependent if they access a common shared variable such that at least one of the accesses is a write operation. In Kahlon et al., it was shown that in statically determining $\triangleright_{s,r}$ one could also incorporate transactions by making use of the semantics of locks to enforce mutual exclusion. This permits us to reduce the number of context switches among threads and hence the state space that needs to be explored, it was shown that by tracking lock acquisition patterns instead of merely locksets one can identify provably large transactions. The over-approximation $\triangleright_s^{lp}$ for $\triangleright_s$ is given below.

Definition (might-be-the-first-to-interfere-modulo-lock-acquisition) Let op and op' be two operations on a common shared variable and s a reachable state of $A_G$. The relation $\triangleright_s^{lp}$ op' holds iff there exist distinct threads $T_i$ and $T_j$ such that there exists (1) a transition of $T_i$ scheduled (not necessarily enabled) at s using op, and (2) a local path $$x: \quad p_o \xrightarrow{t1} \ldots \xrightarrow{tn} p_n$$

of $T_2$ such that $\forall 1 \leq k < n: \forall op''$ used by $t_k$: op and op'' are not statically dependent, $t_n$ uses op', and op and op' are statically dependent and no lock held by $T_i$ in s is acquired by $T_j$ along x.

Analogously, we can statically define an over-approximation $\triangleright_s^{lp-temp}$ that also takes into account lock acquisition patterns for identifying larger transactions.

Definition (temporal-might-be-the-first-to-interfere-modulo-lock-acquisition) Let op and op' be two operations at control locations c and d of threads $T_1$ and $T_2$ such that (c, d)$\in TC_g$, where $TC_g$ is the set of conflict temporal pairs for the given property Eg, and let s be a reachable state of $A_G$. The relation op $\triangleright_s^{lp-temp}$ op' holds iff there exists (1) a transition of $T_1$ scheduled (not necessarily enabled) at s using op. and (2) a local path x:

$$x: \quad p_o \xrightarrow{t1} \ldots \xrightarrow{tn} p_n$$

of $T_2$ such that (i) the control state of $T_2$ in $p_n$ is d, (ii) $\forall 1 \leq k \leq n::(c,c') \notin TCg$ where c' is the control state of $T_2$ in $t_k$, and (iii) and no lock held by $T_1$ in 5 is acquired by $T_2$ along x.

Now replacing the usage of $\triangleright_{s,r}$ and $\triangleright_s^{temp}$ in the above algorithm with $\triangleright_s^{lp}$ and $\triangleright_s^{lp-temp}$, respectively, allows us to statically compute the transitions that need be explored from each global state under both synchronization and temporal constraints.

Synchronous Modeling for Concurrent C Programs: Translating Individual Threads into Circuits: (See e.g., FIG. 1, block 102 and 104.) We first obtain a circuit-based model for each thread, under the assumption of bounded data and bounded control (recursion). Towards that end, we view a control flow graph (CFG) of each thread of the given program as a finite state machine with state vector (pc, V), where pc denotes an encoding of the thread locations, and V is a vector of integer-valued program variables. We construct a symbolic representation of these transition relations resembling a hardware circuit. For the pc variable, we allocate [logN] latches, where N is the total number of thread locations. For each C thread variable, we allocate a vector of n latches, where n is the bit width of the variable. A circuit-based model for each thread of the given concurrent program, is then built where each variable of the thread is represented in terms of a vector of binary-valued latches and a Boolean next-state function (or relation) for each latch. See Kahlon et al. for details.

Building the Circuit for the Concurrent Program: Given the circuit $C_i$ for each individual thread Ti, we now show how to get the circuit C for the concurrent program CP comprised of these threads. In the case where local variables with the same name occur in multiple threads, to ensure consistency, we prefix the name of each local variable of thread $T_i$ with thread_i. Next, for each thread $T_i$, we introduce a gate execute_i indicating whether $P_i$ has been scheduled to execute in the next step of CP or not.

For each latch l, let next-state$_i$ (l) denote the next state function of l in circuit $C_i$. Then in circuit C, the next state value of latch thread_i_l corresponding to a local variable of thread $T_i$, is defined to be next-state$_i$(thread_i_l) if execute_i is true, and the current value of thread_i_l, otherwise. If, on the other hand, latch l corresponds to a shared variable, then next-state(l) is defined to be next-state(l), where execute_i is true. Next, we implement a scheduler which determines in each global state of CP which of the signals execute_i is set to true and thus determines the semantics of thread composition.

Figure 4:
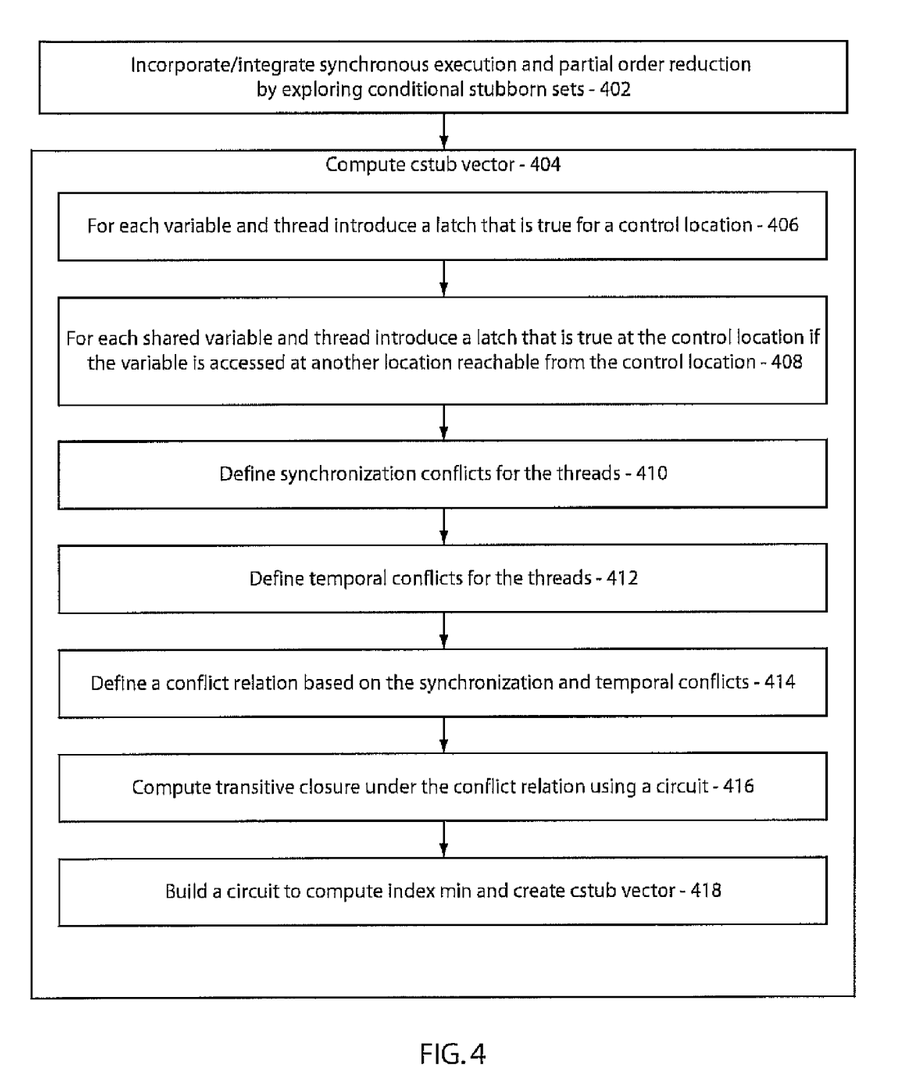
FIG. 4 is a block/flow diagram of a system/method for incorporating/integrating synchronous execution and partial order reduction program verification using model checking in accordance with one illustrative embodiment.

POR+Synchronous Execution:

Referring to FIG. 4, to incorporate/integrate synchronous execution and partial order reduction, we need to ensure that from each global state s, only transitions belonging to (an over-approximation of) a conditional stubborn set of s as defined above are explored in block 402. Let R and $R_i$ denote the transitions relations of CP and $T_i$, respectively. Since CP has two threads, we introduce the 2-bit vector cstub where cstub$_i$ is true for exactly those threads $T_i$ such that the (unique) transition of $T_i$ enabled at s belongs to the same minimal over-approximation of a conditional stubborn set of s as identified by the Example 3 method. Then:

$$R(s, s') = \bigwedge_{i=1,2}$$

(executed_i ⇒ cstubi(s) ˆRi(s,s')).

In block 404, the cstub vector can be computed in the following way:

In block 406: For each shared variable a, and thread $T_i$, we introduce a latch touch-now($T_i$,x) which is true at control location pc$_i$ of $T_i$ iff $T_i$ accesses x at control location pc$_i$. This can be done via a static analysis of the CFG of $T_i$ by determining at which control locations x was accessed and taking a disjunction for those values of pc$_i$.

In block 408: For each shared variable x and thread $T_i$, introduce the latch touch-now-later ($T_j$, x), which is true at control location pc$_j$ of $T_j$ if $T_j$ accesses x at some location pc'$_j$ reachable from pc$_j$. Thus, computing touch-now-later ($T_j$, x) involves deciding the reachability of pc$_j$, and since we cannot compute it exactly without exploring the entire state space $A_G$ of CP, we over-approximate it by doing a context-sensitive analysis of the control-flow graph of $T_j$. We set touch-now-later-pair ($T_j$, x) to true in control pc$_j$ if for some control pc'$_j$ reachable from pc$_j$ in the control flow graph of $T_j$, x is accessed at pc'$_j$.

In block 410: For distinct threads $T_i$ and $T_j$, the relation synch-conflict$_i$ (j) is then defined as $V_x \in V_{sh}$ (touch-now ($T_j$, x) (pc$_i$) ∧ touch-now-later ($T_j$, x) (pc$_j$)), where pc$_i$ and pc$_j$ are the control locations of $T_i$ and $T_j$, respectively, in the current global state and $V_{sh}$ is the set of shared variables of CP.

In block 412: For distinct threads $T_i$ and $T_j$, the relation temp-conflict(j) is defined as $V_{(ci,cj)} \in TC_g$, ((pc$_i$=c$_i$) ˆReachable (pc$_j$, c$_j$), where $TC_g$ is the set of temporal conflict pairs of the given property $E_g$, and Reach (pc$_j$, c$_j$) is true if c$_j$ is reachable from pc$_j$. An over-approximation for Reach (pc$_j$, c$_j$) is determined statically.

In block 414: Define conflict$_i$ (j)=synch-conflict$_i$(j) ∨ temp-conflict$_i$(j).

In block 416: Using a circuit to compute transitive closures, for each i, starting with $J_i=\{i\}$ we compute the closure of $J_1 \ldots J_n$ under the conflict relation defined above.

In block 418: We build a circuit to compute the index min such that the cardinality of $J_{min}$ is the least among the sets $J_1 \ldots J_n$. Finally, ∀1≤i<n, set cstub$_i$=1 iff i∈$J_{min}$. Note that in the implementation we need to pick only one set with the least cardinality.

Cycle detection: Detection of cycles is handled as described in Kahlon et al. Our experience also has been that acyclic state spaces are very common in software implementations for the purpose of model checking and cycle detection and become more critical when one is using an abstraction (which introduces cycles) refinement framework. However, since (i) we put a lot of effort in modeling programs concretely, (ii) do not use abstraction refinement, and (iii) introduce sticky transitions to cover common trivial cases, the impact of the existence of cycles is reduced.

Encoding Lock Pattern based Reductions: To incorporate transactions on-the-fly, we augment the predicate touch-now-later, to generate the new predicate touch-now-later-LS that also includes lock acquisition pattern information. For control locations pc$_i$ and pc'$_i$, of thread $T_i$, let paths (pc$_i$,pc'$_i$) denote the set of paths in the CFG of $T_i$ starting from pc$_i$ that may reach pc'$_i$. For each n E paths(pc$_i$,pc'$_j$) of $T_i$, let lockPred (π) be a formula denoting the set of locks (lk) acquired (and possibly released) along π, e.g., lk$_1$=$T_i$ˆlk$_2$=$T_i$. Let touch-not-later-pair($T_j$,x) (pc$_j$, pc$_j$) encode all possible sets of locks that can potentially be acquired along local paths in $T_i$ from pc$_i$ to pc'$_i$ accessing x, i.e., touch-now-later-pair($T_j$,x) (pc$_j$,pc$_j$) touch-now ($T_j$,x) (pc'j) ˆAP (pc$_j$,pc'$_j$) where AP(pc$_i$,pc'$_i$)= $V_{\pi \in paths(pci,pci)}$ lockPred(π). Let CLP($T_i$, s) denote a formula encoding the ownership of locks by $T_i$ in global state s. Then, the relation touch-now-LS($T_i$, x) is obtained from touch-now-later-pair($T_i$, x) by quantifying out pc'$_i$ and conjoining with the CLP($T_i$,s), i.e., touch-now-LS($T_i$, x) (pc$_i$)=(∃pc'$_i$ touch-now-later-pair ($T_i$, x) (pc$_i$, pc'$_i$) ˆCLP($T_i$,s). Thus, touch-now-LS($T_i$, x) (pc$_i$) is true if there is a location pc$_i$ accessing shared variable x that is reachable from pc$_i$ via a local path π in $T_i$ such that no lock held in s is acquired along n. We evaluate lockPred(π) using a context sensitive static analysis of the CFG of $T_i$. The temp-conflict relation is modified analogously. Here, temp-conflict$_i$(j)=$V_{(ci, cj) \in TCg}$ ((pc$_i$=c$_i$)ˆAP(pc$_j$, c$_j$) ˆCLP($T_1$, s)).

The Daisy Case Study: We have used our technique to find bugs in the Daisy file system which is a benchmark for analyzing the efficacy of different methodologies for verifying concurrent programs. Daisy is a 1KLOC Java implementation of a toy file system where each file is allocated a unique inode that stores the file parameters and a unique block which stores data. An interesting feature of Daisy is that it has fine grained locking in that access to each file, inode or block is guarded by a dedicated lock. Moreover, the acquire and release of each of these locks is guarded by a 'token' lock. Thus, control locations in the program might possibly have multiple open locks and furthermore the acquire and release of a given lock can occur in different procedures. We have shown the existence of the race conditions described below also noted by other researchers.

Memory is a more critical bottleneck in model checking than time. Since usage of synchronous execution clearly leads to a significant reduction in the memory usage, it permits us to (a) handle larger programs, and (b) explore programs to a greater depth than we otherwise could. Usage of synchronous execution reduces the witness depth and as a result the memory usage which depends on the unroll depth of the BMC.

In accordance with useful embodiments, we add constraints so that we explore a conditional stubborn set at each global state thereby yielding considerable state space reduction. The present approach adds information to the model while exploring the state space by detecting dependencies on-the-fly via an analysis of patterns of lock acquisition. Our more refined method generates fewer dependencies between transitions resulting in a lesser number of context switches. This gives us better state space reduction than existing lockset based techniques.

We have presented a new approach for verifying concurrent programs that combines the power of synchronous execution and symbolic techniques with partial order reduction and on-the-fly transactions, while retaining the flexibility to employ a variety of error trace generation/proof techniques—both SAT and BDD-based—for checking not just safety but a broad class of linear time temporal properties. We have also introduced temporal conflicts which enables us to improve partial order reduction techniques by allowing us to compute smaller stubborn sets. Finally, there has been considerable research devoted recently to the parallelization of model checking in order to ensure greater scalability. Since the issues that arise in distributed model checking are precisely those as encountered during synchronous execution, we believe that the notion of temporal conflicts can play a crucial role in distributed model checking.

Having described preferred embodiments of a system and method for accelerating model checking via synchrony (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A computer implemented method for program verification by via bounded or unbounded model checking in concurrent programs, comprising:
   modeling each of a plurality of program threads as a circuit model;
   generating a full circuit for an entire program by combining the circuit models including constraints which enforce synchronous execution of the program threads; and
   verifying the program using the synchronous execution to reduce the amount of memory needed to verify the program and a number of steps taken to uncover an error; wherein using the synchronous execution includes determining synchronous conflicts conflicts to determine the subset of transitions that must be explored from each global state.

2. The method as recited in claim 1, further comprising leveraging synchronous execution to reduce,the depth of computations explored during model checking.

3. The method as recited in claim 1, wherein verifying includes:
   checking necessary interleavings induced by shared variable updates and synchronization primitives by switching from interleaving to synchronous semantics while preserving a temporal property being model checked; and
   integrating synchronous execution with partial order reduction, transactions and symbolic model checking.

4. The method as recited in claim 1, wherein using the synchronous execution includes determining synchronous conflicts.

* * * * *